United States Patent [19]

Michael, III

[11] Patent Number: 5,070,615
[45] Date of Patent: Dec. 10, 1991

[54] PORTABLE HAND-HELD POWER-OPERATED CABLE STRIPPER

[76] Inventor: Ronald N. Michael, III, 1709 Heatherwood Way, Sykesville, Md. 21784

[21] Appl. No.: 544,216

[22] Filed: Jun. 26, 1990

[51] Int. Cl.$^5$ ............................................. B26B 21/14
[52] U.S. Cl. ...................................... 30/90.8; 30/90.4; 81/9.41
[58] Field of Search ............... 30/90.1, 90.2, 90.3, 30/90.4, 90.8, 91.1, 91.2; 81/9.4, 9.41; 310/47, 50

[56] References Cited

U.S. PATENT DOCUMENTS

| | | | |
|---|---|---|---|
| 2,989,806 | 6/1961 | Davis | 30/90.3 |
| 3,022,574 | 2/1962 | Green et al. | 30/90.3 |
| 3,453,917 | 7/1969 | Perry | 83/454 |
| 3,543,614 | 12/1970 | Tibbeyt | 81/9.5 |
| 3,633,275 | 1/1972 | Hutchinson | 30/90.3 |
| 3,851,387 | 12/1974 | Ducret | 30/90.3 |
| 3,857,306 | 12/1974 | Gudmestad | 81/9.51 |
| 3,892,145 | 7/1975 | Richie | 81/9.51 |
| 3,959,877 | 6/1976 | Zorzenon | 30/90.3 |
| 4,019,409 | 4/1977 | McKeever | 81/9.51 |
| 4,051,749 | 10/1977 | Bell et al. | 81/9.51 |
| 4,103,578 | 8/1978 | Ducret | 83/409 |
| 4,169,400 | 10/1979 | Ducret | 83/409 |
| 4,267,636 | 5/1981 | Ducret | 30/90.3 |
| 4,359,819 | 11/1982 | Ducret | 30/90.3 |
| 4,736,501 | 4/1988 | Fujimoto | 29/33 |
| 4,858,315 | 8/1989 | Tanner | 30/90.4 |

Primary Examiner—Mark Rosenbaum
Assistant Examiner—Allan M. Schrock
Attorney, Agent, or Firm—Leonard Bloom

[57] ABSTRACT

A portable hand-held power-operated cable stripper is disclosed. A pressure arm is disposed in and pivotally joined to a handle, so as to have a portion extending therefrom that is gripped during the use thereof. The pressure arm has a forward clamping portion that moves in a first direction and in a second opposite direction. A cable shield stripping means including a motor and a rotary blade driven by the motor is disposed in the handle. The cutting blade is aligned with the forward clamping portion of the pressure arm, such that when the pressure arm is pivoted in the first direction towards the handle, the shielded cable is clamped by the forward clamping portion of the pressure arm and pushed into contact with the cutting blade which longitudinally cuts and strips the shield from the cable. When the forward clamping portion of the pressure arm is pivoted in the second direction, the cable is released. A switch is provided for controlling the flow of electric power from an electric power source to the motor. This switch is activated and deactivated by the movement of the pressure arm that results from the gripping of the handle, so that when the pressure arm is gripped, the switch is automatically switched "on", and further so that when the pressure arm is released, the switch is automatically switched "off". In this manner, a user may both hold the cable cutter and activate the cutting blade thereof with only one hand.

22 Claims, 4 Drawing Sheets

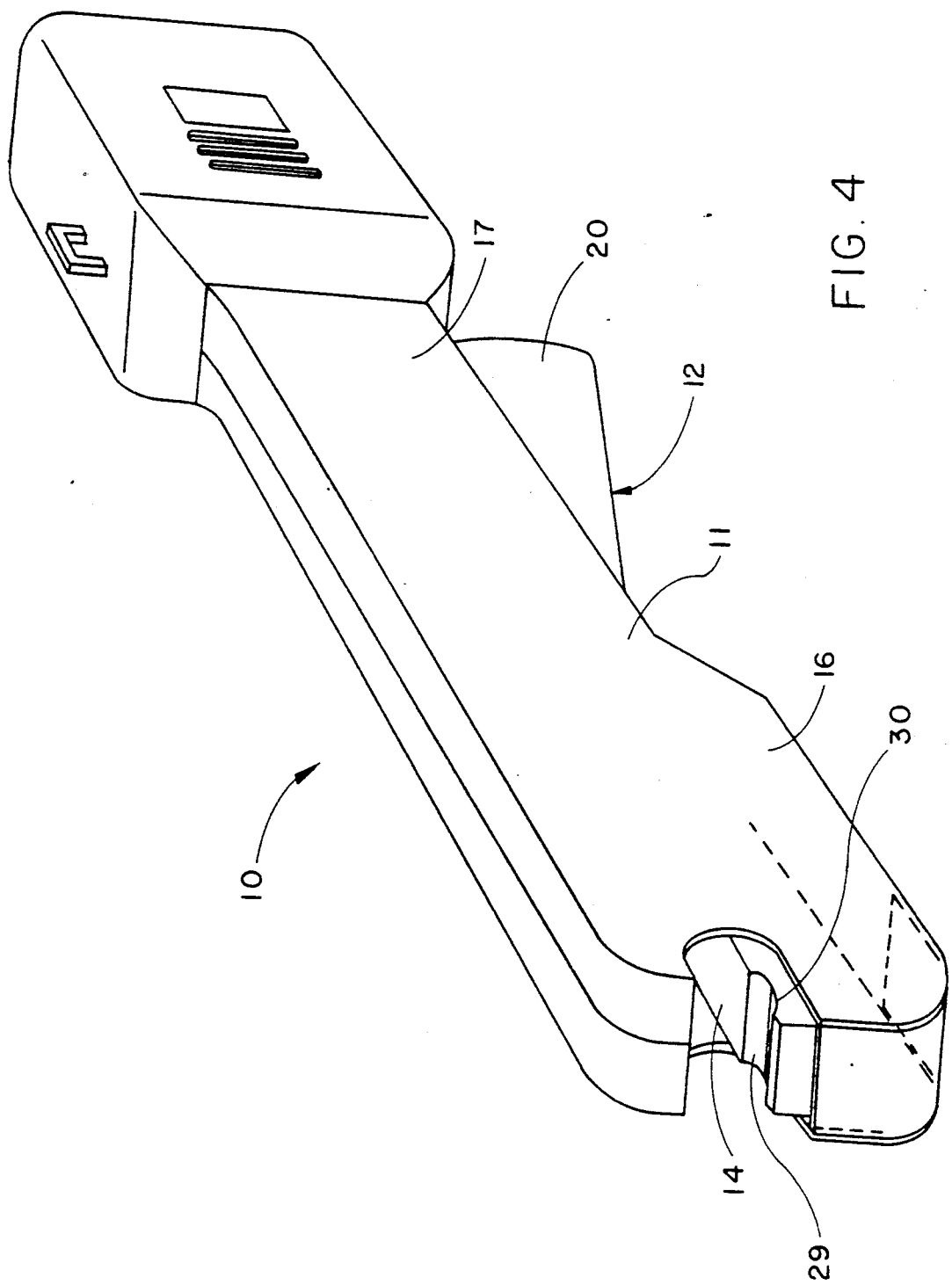

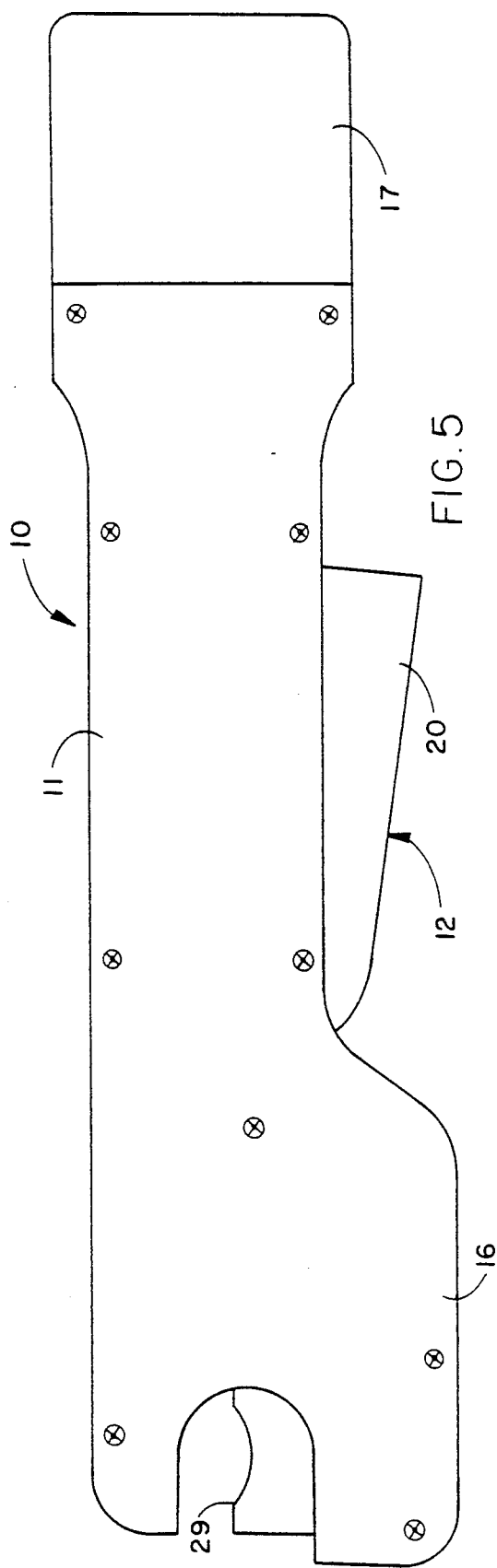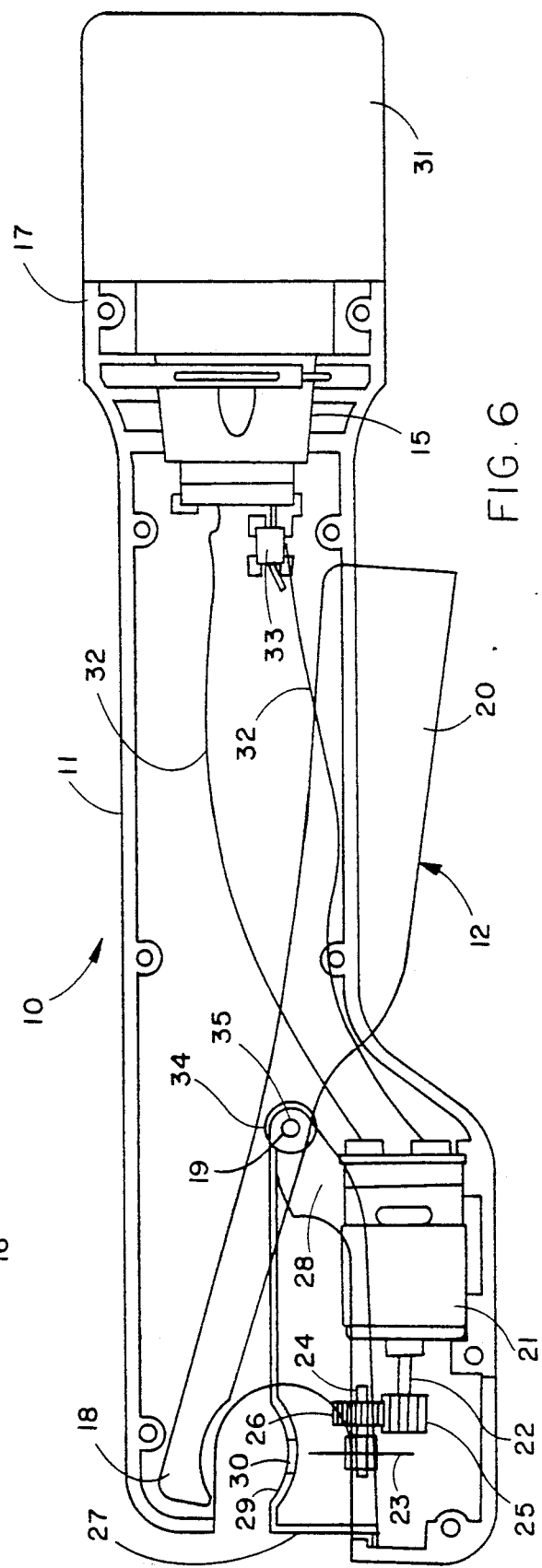

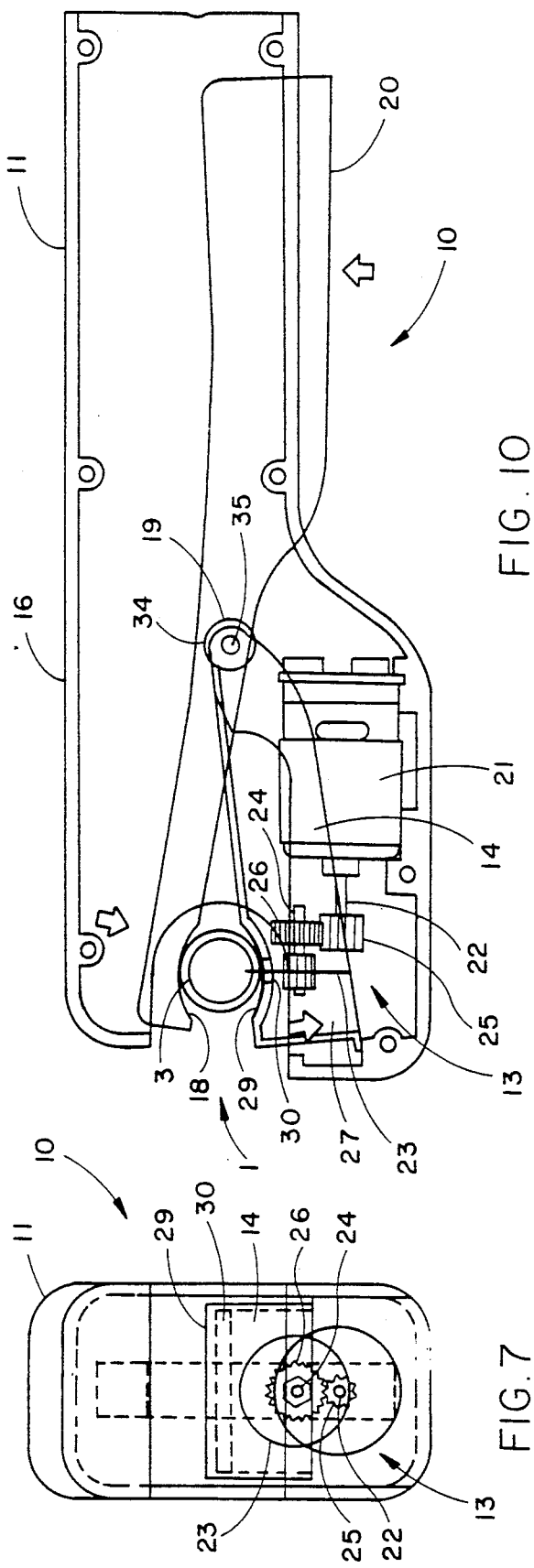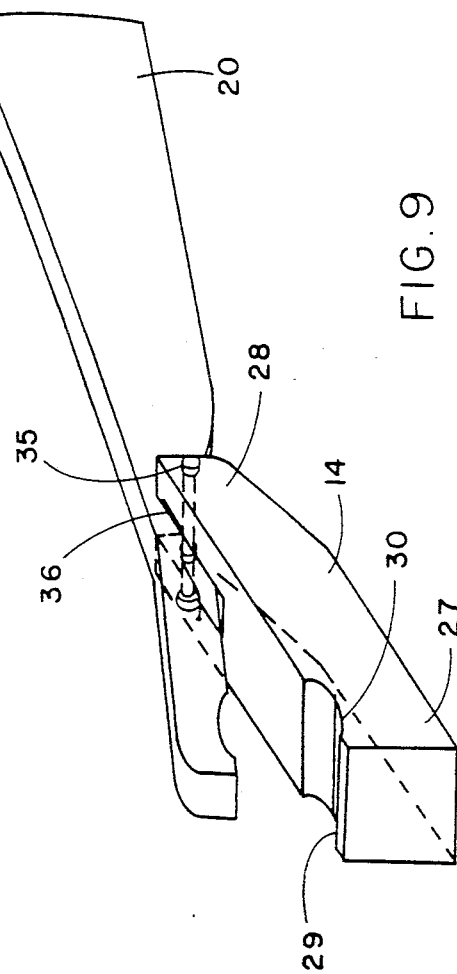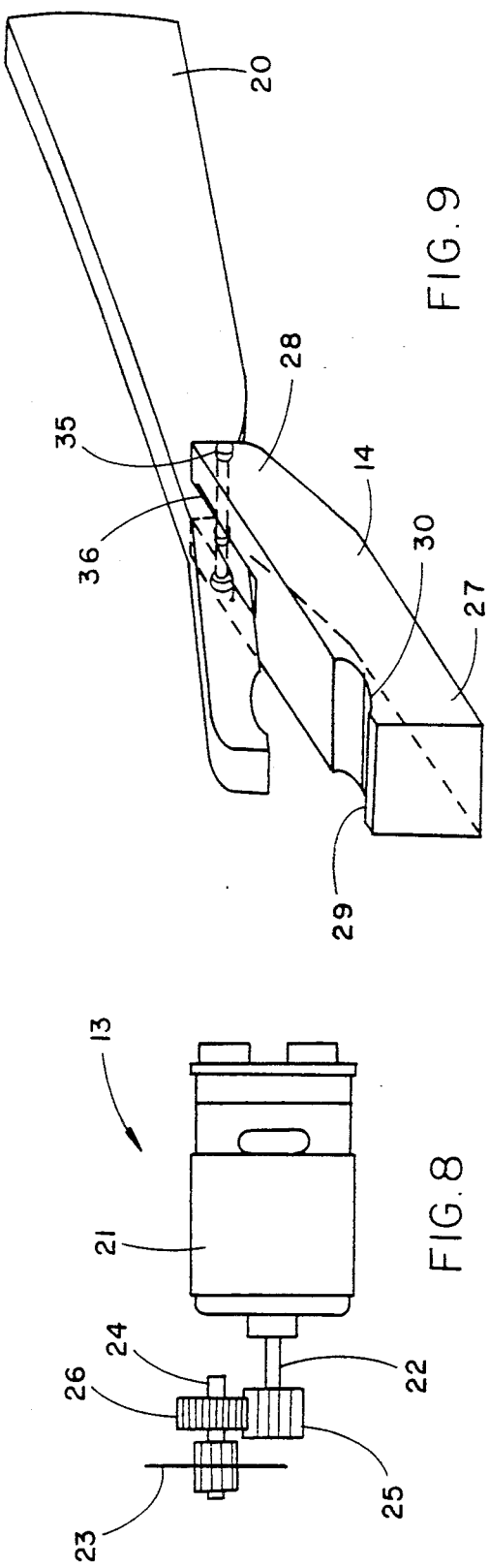

PORTABLE HAND-HELD POWER-OPERATED CABLE STRIPPER

FIELD OF THE INVENTION

The present invention relates to portable hand-held power-operated devices for cutting and stripping a shielded cable.

BACKGROUND OF THE INVENTION

The cutting and stripping of the shield (armor) from a shielded cable has always presented particular problems, especially when such cutting and/or stripping occurred "on-site", under adverse conditions. Most simply, a hacksaw (or a knife) is employed for cutting, and then stripping, the shield from the cable. Unfortunately, the use of such a device is difficult and imprecise, often resulting in a portion or all of the cable also being cut along with the shielded cable or otherwise damaged during the cutting and/or stripping operations.

To solve these problems, several devices have been disclosed for cutting and/or stripping the shield from a cable. Generally, while often being portable, these devices are nonetheless rather large being either free-standing or mounted on a base or a support. Examples of such devices are disclosed in the following U.S. Pat. Nos.:

| Inventor(s) | U.S. Pat. No. | Year Of Issue |
| --- | --- | --- |
| Gudmestad | 3,857,306 | 1974 |
| McKeever | 4,019,409 | 1977 |
| Bell et al | 4,051,749 | 1977 |
| Ducret | 4,103,578 | 1978 |
| Ducret | 4,169,400 | 1979. |

Unfortunately, because of their size, weight and non-handholdability, the use of such devices, in many "on site" circumstances, (i.e., due to "on-site" working conditions) are precluded, thereby preventing the use thereof.

In order to solve the above problems, several hand-held devices have also been proposed for cutting and stripping the shield from the cable. For example in U.S. Pat. No. 3,851,387 issued to Ducret, a cable cutter device is provided that is equipped with a rotary blade tool in order to slit the armor. The device is held by one hand while rotation of the blade is effectuated by a crank handle that must be operated by the users' (or other person's) second hand. Other such references include U.S. Pat. No. 3,892,145 issued to Richie and U.S. Pat. No. 4,858,315 issued to Tanner disclose arrangements wherein the device (the housing) must be held with one hand while, simultaneously, the cable is manually pulled from the device with another hand. Unfortunately, all such devices require the user to not only place and/or hold the shielded cable during the cutting and stripping operations but further requires the user to simultaneously manually hold the device and/or turn the cranks necessary to rotate the cutting blade. Such requirements preclude the use of the device where the user is not able to use both of his or her hands for these purposes.

Other hand-held devices have also been disclosed wherein electrical powered blades are provided to perform the cutting operation. These devices include the following U.S. Pat. Nos.:

| Inventor(s) | U.S. Pat. No. | Year Of Issue |
| --- | --- | --- |
| Tibbeyt | 3,543,614 | 1970 |
| Hutchinson | 3,633,275 | 1972 |
| Zorzenon | 3,959,877 | 1976 |
| Ducret | 4,267,636 | 1981 |
| Fujimoto | 4,736,501 | 1988. |

Unfortunately, each of the above devices nonetheless require the user thereof to hold the tool itself with one hand while the other hand must be used to activate and/or deactivate the motor that cuts the cable.

Despite the longstanding need for the provision of a portable, hand-held, power-operated shielded cable cutter and stripper that may be simultaneously held and power activated by a user while utilizing only one hand, we are not aware of any such device. This is the case even though the need for such a device has coexisted for a longstanding period of time with the references discussed above.

Accordingly, it can be seen that there remains a need for a portable, hand-held, power-operated device for cutting and/or stripping of a shielded cable, which device includes a power motor for driving the cutting blade that is able to be automatically activated or deactivated simply by gripping the device. Such a device could be easily held and used by one hand of the user of the device under conditions and circumstances (that often occur in "on-site" locations) that would ordinarily preclude the use thereof.

SUMMARY OF THE INVENTION

It is a primary object of the present invention to provide a portable, hand-held power-operated device for cutting and stripping the shield from a shielded cable, which device includes an electrically powered rotary blade for cutting and stripping that is activated and/or deactivated by simply gripping the handle of the device during the use thereof, so that the device may be held in one hand by the user thereof in order to be used under difficult conditions without the necessity of activating the operation of the blade with an additional hand.

It is a further object of the present invention to provide such a device that longitudinally cuts and strips the shielded cable.

It is a further object of the present invention to provide such a device that simultaneously engages or clamps against the shielded cable while the operation of the cutting element is automatically activated through the closing of suitable switch contacts.

In accordance to the teachings or the present invention there is disclosed a portable hand-held power-operated device for cutting and stripping a shielded cable. The device includes a handle having a forward end and a rearward end. A pressure arm is provided having a forward clamping portion formed thereon. The pressure arm is pivotally joined to the handle at a pivot point that is located between the forward and rearward ends of the handle. In this matter, the forward clamping portion of the pressure arm pivotally moves in a first direction towards at least a portion of the forward end of the handle for clamping of the shielded cable and in a second opposite direction away from at least a portion of the forward end of the handle for unclamping of the shielded cable. A cable stripping means is provided for stripping the shield from the cable. This means includes an electric motor and a drive shaft, having a longitudinal axis, that is operatively connected to the motor, so that the drive shaft is rotatably driven about the longitudinal axis. This means also includes a cutting blade that is rotationally driven by the drive shaft for longitudinally cutting and stripping the shield from the cable. The cable shield stripping means is carried by the forward end of the handle with the cutting blade being aligned with the forward clamping portion of the pressure arm. In this fashion, when the forward clamping portion of the pressure arm is pivoted in the first direction towards the forward end of the handle, the shielded cable is clamped by the forward clamping portion of the pressure arm and is pushed into contact with the cutting blade which longitudinally cuts and strips the shield from the cable. Further, means for providing and controlling the flow of electric power to the motor is provided. This means includes an electrical power source that is disposed in the handle. An electrical connection means for electrically connecting the power source to the motor is provided. The connection means is disposed in the handle. An electric switch is also provided for controlling the flow of electric power from the power source to the motor. The switch has an "on" position for permitting the flow of electric power, and a "off" position for terminating the flow of electric power. The pivotal movement of the pressure arm in the first direction places the switch in the "on" position, such that the switch is automatically placed in the "on" position. This activates the cutting blade at the same time that the shielded cable is clamped between the forward clamping portion and the cutting blade for cutting and stripping of the shield from the cable. Finally, the pivotal movement of the pressure arm in the second direction places the switch in the "off" position, such that the switch is automatically placed in the "off" position. This deactivates the cutting blade at the same time that the shield and the cable are released from between the forward clamping portion and the cutting blade.

Preferably, a blade guard is also provided. The blade guard includes a forward end having a slot formed therein through which the cutting blade may be received. The blade guard is pivotally joined to the handle at the pivot point, such that the forward end, including the slot thereof, pivotally moves in a first direction towards the cutting blade. This permits the cutting blade to be received through the slot for contacting the shielded cable, whereby the cutting blade cuts and strips the shield from the cable. The forward end, including the slot thereof, also pivotally moves in a second direction away from the cutting blade. This permits the cutting blade to be withdrawn from the slot being shielded by the blade guard, whereby accidental cutting by the cutting blade is prevented.

In further accordance with the teachings of the present invention, there is disclosed herein a portable electric cable cutter for cutting and stripping a shielded cable. This device includes a handle, an electric motor carried by the handle and a rotary blade driven by the motor. The rotary blade is disposed in the handle for longitudinally cutting and stripping the shielded cable. Means is provided for electrically connecting the battery to the motor, such that electric power is supplied by the battery to the motor for driving the rotary blade. A switch provides for controlling the flow of electric power from the battery to the motor. The switch has an "on" position, wherein the flow of electric power from the battery to the motor is permitted and an "off" position, wherein the flow of electric power from the battery to the motor is prevented. The switch is disposed in the handle, so that gripping of the handle by the user thereof moves the switch into the "on" position, and further so that releasing of the handle by the user thereof moves the switch into the "off" position.

These and other objects and advantages of the present invention will be more clearly perceived and fully understood by reference to the following description, taken in conjunction with the accompanying drawings, set forth below.

BRIEF DESCRIPTION OF THE DRAWINGS

FIG. 4 is a perspective view of the portable power-operated device of the present invention.

FIG. 5 is a side view of the device of FIG. 4.

FIG. 6 is a cross-section view taken along lines 6—6 of FIG. 4.

FIG. 7 is an end view of the device taken along lines 7—7 of FIG. 5.

FIG. 8 is a side view of the means for cutting and stripping the shield from a shielded cable removed from the remainder of the device for the sake of clarity.

FIG. 9 is a detail of the blade guard and pressure arm removed from the remainder of the device for the sake of clarity.

FIG. 10 is a cross-section view of the device, corresponding substantially to FIG. 6, illustrating the operation of the device when a shielded cable is received therein for the cutting and stripping thereof.

DESCRIPTION OF PREFERRED EMBODIMENTS

Figure 1:
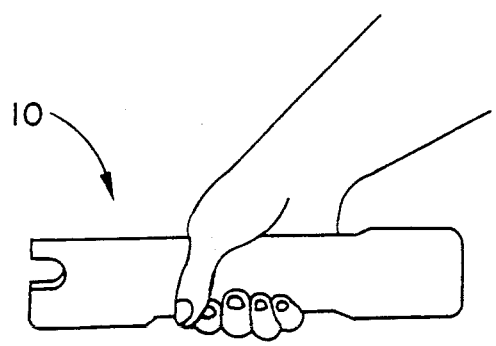
FIG. 1 is a perspective view of the device of the present invention held in one hand by a user.
Figure 2:
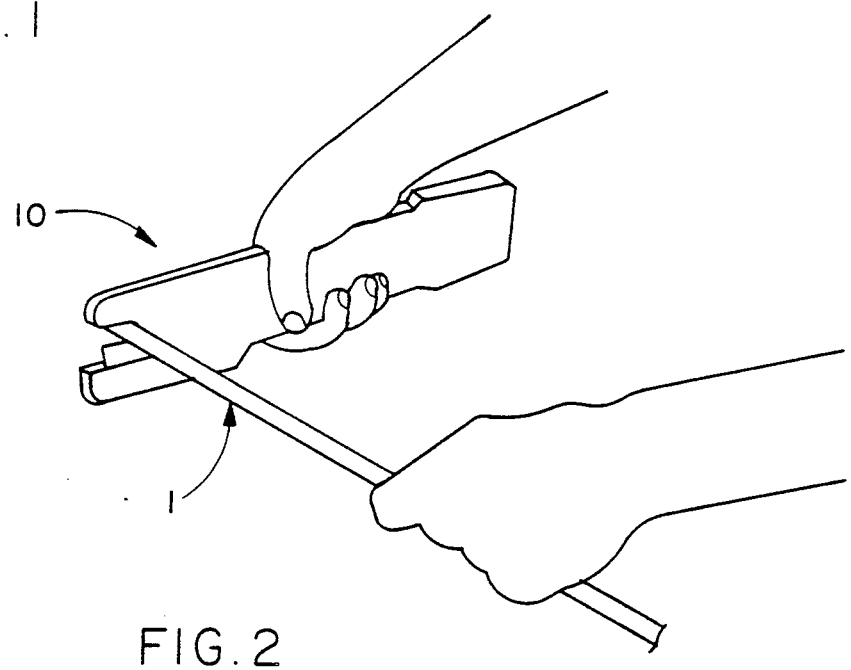
FIG. 2 is a perspective view of the device of the present invention showing a typical use in which the user inserts a cable into the device.
Figure 3:
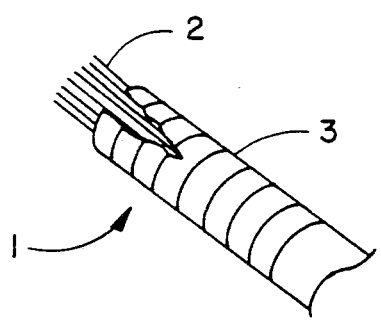
FIG. 3 is a perspective view of a cable showing the cut produced in the shield of the cable by the device of the present invention.

Referring now to the drawings, the device 10 of the present invention is a portable, hand-held, power-operated cutter and stripper that may be easily and quickly utilized in virtually all situations and under virtually all conditions. The user thereof may, with the use of only one hand, simultaneously grip the handle of the device 10, to both hold the device 10 and to energize the rotary blade for starting the cutting and the stripping of the shield 3 from the cable 2 of the shielded cable 1. Use of this device 10 permits the other hand to remain free for holding the cable 1 or for performing any other necessary or desired duty (as seen in FIGS. 1 and 2).

The device 10 includes a handle 11, a pressure arm 12, a cable shield stripping means 13, a blade guard 14 and means 15 for providing and controlling the flow of electric power to the cable shield stripping means 13. All of these elements 12-15 are housed in the handle 11 of the device 10

The handle 11 has a forward end 16 and a rearward end 17. The handle 11 is substantially hollow for receiving and housing the elements 12-15 therein. The handle 11 may be fabricated from any suitable material, such as a lightweight metal or metal alloy or even heavy-duty plastic.

A pressure arm 12 has a forward clamping portion 18 formed thereon. The pressure arm 12 is pivotally joined to the handle 11 at a pivot point 19 that is located between the forward and rearward ends 16 and 17, respectively, of the handle 11. In this fashion, the forward clamping portion 18 of the pressure arm 12 pivotally moves in both a first direction and in a second opposite direction. In the first direction, the clamping portion 18 moves toward at least a portion of the forward end 16 of the handle 11 for clamping of the shielded cable 1 (see FIG. 10). In the second direction, the clamping portion 18 moves away from at least a portion of the forward end 16 of the handle 11 for unclamping of the shielded cable 1. Finally, the pressure arm 12 also has a second portion 20 that is located rearwardly of the pivot point 19. This second portion 20 extends from the handle 11 and is gripped by the user thereof when holding and using the device 10 for pushing the forward clamping portion 18 of the pressure arm 12 in the first direction.

A cable shield stripping means 13 is provided being carried by the forward end 16 of the handle 11 for stripping the shield 3 from the cable 2. This shield cable stripping means 13 includes an electric motor 21 that is, preferably as seen in the drawings, disposed in the forward end 16 of the handle 11. A drive shaft 22, having a longitudinal axis, is operatively connected to the motor 21, so that the drive shaft 22 is rotatably driven about its longitudinal axis by the motor 21. Preferably, the drive shaft 22 extends forwardly from the motor 21.

The cable shield stripping means 13 further includes a cutting blade (rotary cutting blade) 23 that is rotationally driven by the drive shaft 22 for cutting and stripping the shield 3 from the cable 2 of the shielded cable 1. This blade 23 is also disposed in the forward end 16 of the handle 11 being aligned with the forward clamping portion 18 of the pressure arm 12. In this fashion, when the forward clamping portion 18 of the pressure arm 12 is pivoted in the first direction towards the forward end 16 of the handle 11, the shielded cable 1 is clamped by the forward clamping portion 18 of the pressure arm 12 and is pushed into contact with the cutting blade 23, which longitudinally cuts and strips the shield 3 from the cable 2.

The blade 23 is operatively connected to the shaft 22 by any suitable means including, as is illustrated in the drawings, a second shaft 24 having a longitudinal axis. This second shaft 24 is positioned substantially parallel to the drive shaft 22. The cutting blade 23 is carried by (disposed on) the second shaft 24, so that the blade 23 is substantially perpendicular to the drive shaft 22 and to the second shaft 24. Finally, respective mating meshing toothed gears 25 and 26 are carried on, respectively, the drive shaft 22 and the second shaft 24, such that rotation of the drive shaft 22 about the longitudinal axis thereof concomitantly rotates the second shaft 24 therewith, about the respective longitudinal axis thereof. In this manner, rotation of the drive shaft 22 and the second shaft 24 about the respective longitudinal axes thereof rotates the cutting blade 23, concomitantly therewith.

The blade guard 14 is substantially disposed in the forward end 16 of the handle 11. The blade guard 14 includes a forward end 27 and a rearward end 28. The rearward end 18 of the blade guard 14 is, like the pressure arm 12, pivotally joined to the handle 11 at the pivot point 19 for pivotal movement of the blade guard 14 in a first and a second opposite direction. As will be further discussed below, in the first direction, the blade guard 14 is moved towards the cutting blade 23. In the second direction, the blade guard 14 is moved away from the cutting blade 23.

The forward end 27 of the blade guard 14 includes a respective clamping portion 29 which, when the pressure arm 12 and the blade guard 14 are moved in their respective first directions, the cable 1 is firmly clamped between the clamping portions 18 and 29, respectively, of the pressure arm 12 and the blade guard 14, such that the shield cable 1 is pushed against the blade 23 while the blade 23 is cutting and stripping the shield 3 from the cable 2.

The clamping portion 29 of the forward end 27 has a slot 30 formed therein. In this manner, when the blade guard 14 is moved in the first direction, the cutting blade 23 is received through the slot 30 for contacting the shielded cable 1 that is clamped between the portions 18 and 29 while the cutting blade 23 cuts and strips the shield 3 from the cable 2 during the cutting and stripping operations. Further in this manner, when the blade guard 14 is moved in the second direction, the cutting blade 23 is withdrawn from the slot 30, so that the blade 23 is shielded by the blade guard 14, whereby accidental cutting by the cutting blade 23 is prevented.

The means 15 for providing and controlling the flow of electric power to the motor 21 is also disposed in the handle 11, as needed. This means 15 includes an electrical power source 31. Preferably, this power source 31 is in the form of an electrical battery that is disposed in the rearward end 17 of the handle 11. This means 15 further includes an electrical connection means 32 for electrically connecting the power source 31 to the motor 21. This electrical connection means 32 is, preferably, in the form of electrical wires disposed in the handle 11 that extend between, and are electrically connected to, the power source 31 and the motor 21.

Finally, the means 15 further includes an electric switch 33 for controlling the flow of electric power from the power source 31 to the motor 21. This switch 33 has an "on" position for permitting the flow of electric power and an "off" position for terminating the flow of electric power. Preferably, this switch 33 is either in the form a switch that is contacted by a portion of the pressure arm 12 for activation (as seen in FIG. 6), or in the form of electrical contacts that are carried on the rearward end of the pressure arm 12. In this fashion, the pivotal movement of the pressure arm 12 in the first direction places the switch 33 in the "on" position, such that the switch 33 is automatically placed in the "on" position for activating the cutting blade 23 at the same time that the shielded cable 1 is clamped between the forward clamping portion 18 and the cutting blade 23 for cutting and stripping of the shield 3 from the cable 2. Further in this fashion, the pivotal movement of the pressure arm 12 in the second direction places the switch 33 in the "off" position, such that the switch 33 is automatically placed in the "off" position for deactivating the cutting blade 23 at the same time that the shield 3 and the cable 2 are released from between the forward clamping portion 18 and the cutting blade 23.

It is preferred that a resilient means 34 be provided for constantly urging the forward clamping portion 18 of the pressure arm 12 and the forward portion 27 of the blade guard 14 in the respective second directions thereof. In a preferred embodiment, this resilient means 34 is provided by a pivot shaft 35 being carried by the handle 11 between the forward and the rearward ends thereof at the pivot point 19. The pressure arm 12 and the blade guard 14 are both pivotally mounted on the pivot shaft 35 at the pivot point 19. Finally, a leaf spring 36 is carried by the pivot shaft 35 (that is, in turn, carried by the handle 11) being looped over the pivot shaft 35 and having opposite ends that bear against (contact), respectively, the pressure arm 12 and the blade guard 14 (see FIG. 9). In this manner, the pressure arm and the blade guard 14 are constantly urged in the respective second opposite directions thereof.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A portable hand-held power operated device for cutting and stripping a shielded cable, the device, in combination, comprised of:
   a handle having a forward end and a rearward end;
   a pressure arm having a forward clamping portion formed thereon, the pressure arm being pivotally joined to the handle at a pivot point being located between the forward and rearward ends of the handle, such that the forward clamping portion of the pressure arm pivotally moves in a first direction towards at least a portion of the forward end of the handle for clamping of the shielded cable and in a second opposite direction away from at least a portion of the forward end of the handle for unclamping of the shielded cable;
   a cable shield stripping means for stripping the shield from the cable, said means including an electric motor, a drive shaft having a longitudinal axis, the drive shaft being operatively connected to the motor, so that the drive shaft is rotatably driven about the longitudinal axis and a cutting blade being rotationally driven by the drive shaft for cutting and stripping the shield from the cable;
   the cable shield stripping means being carried by the forward end of the handle with the cutting blade being aligned with the forward clamping portion of the pressure arm, such that when the forward clamping portion of the pressure arm is pivoted in the first direction towards the forward end of the handle, the shielded cable is clamped by the forward clamping portion of the pressure arm and is pushed into contact with the cutting blade which longitudinally cuts and strips the shield from the cable;
   means for providing and controlling the flow of electric power to the motor including an electrical power source disposed in the handle and electrical connection mean for electrically connecting the power source to the motor, said connection means being disposed in the handle and an electric switch for controlling the flow of electric power from the power source to the motor, the switch having an "on" position for permitting the flow of electric power and an "off" position for terminating the flow of electric power;
   wherein the pivotal movement of the pressure arm in the first direction places the switch in the "on" position, such that the switch is automatically placed in the "on" position for activating the cutting blade at the same time that the shielded cable is clamped between the forward clamping portion and the cutting blade for cutting and stripping of the shield from the cable; and
   further wherein the pivotal movement of the pressure arm in the second direction places the switch in the "off" position, such that the switch is automatically placed in the "off" position for deactivating the cutting blade at the same time that the shield and the cable are released from between the forward clamping portion and the cutting blade; whereby the device may be simultaneously held and power deactivated/activated by a user utilizing only one hand.

2. The device of claim 1, wherein the combination is further comprised of:
   resilient means for constantly urging the forward clamping portion of the pressure arm in the second direction.

3. The device of claim 2, wherein the resilient means is a leaf spring carried by the handle and contacting the pressure arm for constantly urging the pressure arm in the second opposite direction.

4. The device of claim 2, wherein the resilient means is comprised of:
   a pivot shaft carried by the handle between the forward and rearward ends thereof at the pivot point;
   the pressure arm being pivotally mounted on the pivot shaft at the pivot point; and
   a leaf spring carried by the pivot shaft and contacting the pressure arm for constantly urging the pressure arm in the second opposite direction.

5. The device of claim 1, wherein the electric power source is an electric battery.

6. The device of claim 1, the combination further comprised of:
   a blade guard, the blade guard including a forward end having a slot formed therein through which the cutting blade may be received, the blade guard being pivotally joined to the handle at the pivot point, such that the forward end including the slot thereof pivotally moves in a first direction towards the cutting blade so that the cutting blade is received through the slot for contacting the shield cable, whereby the cutting blade cuts and strips the shield from the cable, and further such that the forward end including the slot thereof pivotally moves in a second direction away from the cutting blade so that the cutting blade is withdrawn from the slot being shielded by the blade guard, whereby accidental cutting by the cutting blade is prevented.

7. The device of claim 1, wherein the forward end of the blade guard includes a respective clamping portion, and wherein the slot is formed in the clamping portion, such that the shielded cable is firmly clamped between the clamping portions of the pressure arm and the blade guard and against the cutting blade while the cutting blade is cutting and stripping the shield from the cable.

8. The device of claim 6, the combination further comprised of:
   resilient means for constantly urging the blade guard in the second direction.

9. The device of claim 8, wherein the resilient means is a leaf spring carried by the handle and contacting the blade guard for constantly urging the blade guard in the second opposite direction.

10. The device of claim 8, wherein the resilient means is comprised of:
    a pivot shaft carried by the handle between the forward and rearward ends thereof at the pivot point;
    the blade guard being pivotally mounted on the pivot shaft at the pivot point; and a leaf spring carried by the pivot shaft and contacting the blade guard for constantly urging the pressure arm in the second opposite direction.

11. The device of claim 6, the combination is further comprised of:

resilient means for constantly urging the blade guard in the second direction and further for constantly urging the forward clamping portion of the pressure arm in the second direction, the resilient means including a pivot shaft carried by the handle between the forward and rearward ends thereof at the pivot point, the pressure arm and the blade guard each being pivotally mounted on the pivot shaft at the pivot point, and a leaf spring carried by the pivot shaft and contacting the pressure arm and the blade guard for constantly urging the pressure arm and the blade guard in the respective second opposite directions.

12. The device of claim 1, wherein the combination is further comprised of:

the cutting blade being disposed on a second shaft having a longitudinal axis, the cutting blade being substantially perpendicular to the drive shaft, so that rotation of the second shaft about the longitudinal axis thereof rotates the cutting blade concomitantly therewith;

respective mating meshing toothed gears carried by the drive shaft and the second shaft, such that rotational movement of the drive shaft about the longitudinal axis thereof concomitantly rotates the second shaft therewith.

13. The device of claim 1, wherein the pressure arm further has a second portion located rearwardly of the pivot point for being gripped by the user thereof for pushing the forward clamping portion of the pressure arm in the first direction.

14. A portable hand-held power-operated device for cutting and stripping a shielded cable, the device, in combination, comprised of:

a handle having a forward end and a rearward end;

a pressure arm having a forward clamping portion formed thereon, the pressure arm being pivotally joined to the handle at a pivot point being located between the forward and rearward ends of the handle, such that the forward clamping portion of the pressure arm pivotally moves in a first direction towards at least a portion of the forward end of the handle for clamping of the shielded cable and in a second opposite direction away from at least a portion of the forward end of the handle for unclamping of the shielded cable;

a cable shield stripping means for stripping the shield from the cable, said means including an electric motor, a drive shaft having a longitudinal axis, the drive shaft being operatively connected to the motor, so that the drive shaft is rotatably driven about the longitudinal axis and a cutting blade being rotationally driven by the drive shaft for cutting and stripping the shield from the cable;

the cable shield stripping means being carried by the forward end of the handle with the cutting blade being aligned with the forward clamping portion of the pressure arm, such that when the forward clamping portion of the pressure arm is pivoted in the first direction towards the forward end of the handle, the shielded cable is clamped by the forward clamping portion of the pressure arm and is pushed into contact with the cutting blade which longitudinally cuts and strips the shield from the cable;

means for providing and controlling the flow of electric power to the motor including an electrical power source disposed in the handle and electrical connection means for electrically connecting the power source to the motor, said connection means being disposed in the handle and an electric switch for controlling the flow of electric power from the power source to the motor, the switch having an "on" position for permitting the flow of electric power and an "off" position for terminating the flow of electric power;

wherein the pivotal movement of the pressure arm in the first direction places the switch in the "on" position, such that the switch is automatically placed in the "on" position for activating the cutting blade at the same time that the shielded cable is clamped between the forward clamping portion and the cutting blade for cutting and stripping of the shield from the cable; and further wherein the pivotal movement of the pressure arm in the second direction places the switch in the "off" position, such that the switch is automatically placed in the "off" position for deactivating the cutting blade at the same time that the shield and the cable are released from between the forward clamping portion and the cutting blade; whereby the device may be simultaneously held and power deactivated/activated by a user utilizing only one hand;

a blade guard, the blade guard including a forward end having a slot formed therein through which the cutting blade may be received, the blade guard being pivotally joined to the handle at the pivot point, such that the forward end including the slot thereof pivotally moves in a first direction towards the cutting blade so that the cutting blade is received through the slot for contacting the shielded cable, whereby the cutting blade cuts and strips the shield from the cable, and further such that the forward end including the slot thereof pivotally moves in a second direction away from the cutting blade s that the cutting blade is withdrawn from the slot being shielded by the blade guard, whereby accidental cutting by the cutting blade is prevented;

a pivot shaft carried by the handle between the forward and rearward ends thereof at the pivot point; and the pressure arm and the blade guard being pivotally mounted on the pivot shaft at the pivot point.

15. A portable hand-held power-operated device for cutting and stripping a shielded cable, the device, in combination, comprised of:

a handle having a forward end and a rearward end;

a pressure arm having a forward clamping portion formed thereon, the pressure arm being pivotally joined to the handle at a pivot point being located between the forward and rearward ends of the handle, such that the forward clamping portion of the pressure arm pivotally moves in a first direction towards at least a portion of the forward end of the handle for clamping of the shielded cable and in a second opposite direction away from at least a portion of the forward end of the handle for unclamping of the shielded cable;

a cable shield stripping means for stripping the shield from the cable, said means including an electric motor, a drive shaft having a longitudinal axis, the drive shaft being operatively connected to the motor, so that the drive shaft is rotatably driven about the longitudinal axis and a cutting blade being rotationally driven by the drive shaft for cutting and stripping the shield from the cable;

the cable shield stripping means being carried by the forward end of the handle with the cutting blade being aligned with the forward clamping portion of the pressure arm, such that when the forward clamping portion of the pressure arm is pivoted in the first direction towards the forward end of the handle, the shielded cable is clamped by the forward clamping portion of the pressure arm and is pushed into contact with the cutting blade which longitudinally cuts and strips the shield from the cable;

means for providing and controlling the flow of electric power to the motor including and electrical power source disposed in the handle and electrical connection means for electrically connecting the power source to the motor, said connection means being disposed in the handle and an electric switch for controlling the flow of electric power from the power source to the motor, the switch having an "on" position for permitting the flow of electric power and an "off" position for terminating the flow of electric power;

wherein the pivotal movement of the pressure arm in the first direction places the switch in the "on" position, such that the switch is automatically placed in the "on" position for activating the cutting blade at the same time that the shielded cable is clamped between the forward clamping portion and the cutting blade for cutting and stripping of the shield from the cable; and further wherein the pivotal movement of the pressure arm in the second direction places the switch in the "off" position, such that the switch is automatically placed in the "off" position for deactivating the cutting blade at the same time that the shield and the cable are released from between the forward clamping portion and the cutting blade; whereby the device may be simultaneously held and power deactivated/activated by a user utilizing only one hand;

a blade guard, the blade guard including a forward end having a slot formed therein through which the cutting blade may be received, the blade guard being pivotally joined to the handle at the pivot point, such that the forward end including the slot thereof pivotally moves in a first direction towards the cutting blade so that the cutting blade is received through the slot for contacting the shielded cable, whereby the cutting blade cuts and strips the shield from the cable, and further such that the forward end including the slot thereof pivotally moves in a second direction away from the cutting blade so that the cutting blade is withdrawn from the slot being shielded by the blade guard, whereby accidental cutting by the cutting blade is prevented;

a pivot shaft carried by the handle between the forward and rearward ends thereof at the pivot point;

the pressure arm and the blade guard being pivotally mounted on the pivot shaft at the pivot point; and resilient means carried by the pivot shaft for constantly urging the blade guard in the second direction and further for constantly urging the forward clamping portion of he pressure arm in the second direction.

16. A portable hand-held power-operated device for cutting and stripping a shielded cable, the device, in combination, comprised of:

a handle having a forward end and a rearward end;

a pressure arm having a forward clamping portion formed thereon, the pressure arm being pivotally joined to the handle at a pivot point being located between the forward and rearward ends of the handle, such that the forward clamping portion of the pressure arm pivotally moves in a first direction towards at least a portion of the forward end of the handle for clamping of the shielded cable and in a second opposite direction away from at least a portion of the forward end of the handle for unclamping of the shielded cable;

a cable shield stripping means for stripping the shield from the cable, said means including an electric motor, a drive shaft having a longitudinal axis, the drive shaft being operatively connected to the motor, so that the drive shaft is rotatably driven about the longitudinal axis and a cutting blade being rotationally driven by the drive shaft for cutting and stripping the shield from the cable;

the cable shield stripping means being carried by the forward end of the handle with the cutting blade being aligned with the forward clamping portion of the pressure arm, such that when the forward clamping portion of the pressure arm is pivoted in the first direction towards the forward end of the handle, the shielded cable is clamped by the forward clamping portion of the pressure arm and is pushed into contact with the cutting blade which longitudinally cuts and strips the shield from the cable;

means for providing and controlling the flow of electric power to the motor including an electrical power source disposed in the handle and electrical connection means for electrically connecting the power source to the motor, said connection means being disposed in the handle and an electric switch for controlling the flow of electric power from the power source to the motor, the switch having an "on" position for permitting the flow of electric power and an "off" position for terminating the flow of electric power;

wherein the pivotal movement of the pressure arm in the first direction places the switch in the "on" position, such that the switch is automatically placed in the "on" position for activating the cutting blade at the same time that the shielded cable is clamped between the forward clamping portion and the cutting blade for cutting and stripping of the shield from the cable; and further wherein the pivotal movement of the pressure arm in the second direction places the switch in the "off" position, such that the switch is automatically placed in the "off" position for deactivating the cutting blade at the same time that the shield and the cable are released from between the forward clamping portion and the cutting blade; whereby the device may be simultaneously held and power deactivated/activated by a user utilizing only one hand;

a blade guard, the blade guard including a forward end having a slot formed therein through which the cutting blade may be received, the blade guard being pivotally joined to the handle at the pivot point, such that the forward end including the slot thereof pivotally moves in a first direction towards the cutting blade so that the cutting blade is received through the slot for contacting the shielded cable, whereby the cutting blade cuts and strips the shield from the cable, and further such that the forward end including the slot thereof pivotally moves in a second direction away from the cutting blade so that the cutting blade is withdrawn from the slot being shielded by the blade guard, whereby accidental cutting by the cutting blade is prevented; and resilient means for constantly urging the blade guard in the second direction and further for constantly urging the forward clamping portion of the pressure arm in the second direction, the resilient means including a pivot shaft carried by the handle between the forward and rearward ends thereof at the pivot point, the pressure arm and the blade guard each being pivotally mounted on the pivot shaft at the pivot point, and a leaf spring carried by the pivot shaft and contacting the pressure arm and the blade guard for constantly urging the pressure arm and the blade guard in the respective second opposite directions.

17. A portable hand-held power-operated device for cutting and stripping a shielded cable, the device, in combination, comprised of:

a handle having a forward end and a rearward end;

a pressure arm having a forward clamping portion formed thereon, the pressure arm being pivotally joined to the handle at a pivot point being located between the forward and rearward ends of the handle, such that the forward clamping portion of the pressure arm pivotally moves in a first direction towards at least a portion of the forward end of the handle for clamping of the shielded cable and in a second opposite direction away from at least a portion of the forward end of the handle for unclamping of the shielded cable;

a cable shield stripping means for stripping the shield from the cable, said means including an electric motor, a drive shaft having a longitudinal axis, the drive shaft being operatively connected to the motor, so that the drive shaft is rotatably driven about the longitudinal axis and a cutting blade being rotationally driven by the drive shaft for cutting and stripping the shield from the cable;

the cable shield stripping means being carried by the forward end of the handle with the cutting blade being aligned with the forward clamping portion of the pressure arm, such that when the forward clamping portion of the pressure arm is pivoted in the first direction towards the forward end of the handle, the shielded cable is clamped by the forward clamping portion of the pressure arm and is pushed into contact with the cutting blade which longitudinally cuts and strips the shield from the cable;

means for providing and controlling the flow of electric power to the motor including an electrical battery disposed in the handle and electrical connection means for electrically connecting the battery to the motor, said connection means being disposed in the handle and an electric switch for controlling the flow of electric power from the battery to the motor, the switch having an "on" position for permitting the flow of electric power and an "off" position for terminating the flow of electric power;

wherein the pivotal movement of the pressure arm in the first direction places the switch in the "on" position, such that the switch is automatically placed in the "on" position for activating the cutting blade at the same time that the shielded cable is clamped between the forward clamping portion and the cutting blade for cutting and stripping of the shield from the cable; and further wherein the pivotal movement of the pressure arm in the second direction places the switch in the "off" position, such that the switch is automatically placed in the "off" position for deactivating the cutting blade at the same time that the shield and the cable are released from between the forward clamping portion and the cutting blade;

the pressure arm further having a second portion located rearwardly of the pivot point for being gripped by the user thereof for pushing the forward end of the pressure arm in the first direction; and whereby the device may be simultaneously held and power deactivated/activated by a user utilizing only one hand; and a blade guard, the blade guard including a forward end having a slot formed therein through which the cutting blade may be received, the blade guard being pivotally joined to the handle at the pivot point, such that the forward end including the slot thereof pivotally moves in a first direction towards the cutting blade so that the cutting blade is received through the slot for contacting the shielded cable, whereby the cutting blade cuts and strips the shield from the cable, and further such that the forward end including the slot thereof pivotally moves in a second direction away from the cutting blade so that the cutting blade is withdrawn from the slot being shielded by the blade guard, whereby accidental cutting by the cutting blade is prevented.

18. A portable hand-held power-operated device for cutting and stripping a shielded cable, the device, in combination, comprised of:

a handle having a forward end and a rearward end;

a pressure arm having a forward clamping portion formed thereon, the pressure arm being pivotally joined to the handle at a pivot point being located between the forward and rearward ends of the handle, such that the forward clamping portion of the pressure arm pivotally moves in a first direction towards at least a portion of the forward end of the handle for clamping of the shielded cable and in a second opposite direction away from at least a portion of the forward end of the handle for unclamping of the shielded cable;

a cable shield stripping means for stripping the shield from the cable, said means including an electric motor, a drive shaft having a longitudinal axis, the drive shaft being operatively connected to the motor, so that the drive shaft is rotatably driven about the longitudinal axis and a cutting blade being rotationally driven by the drive shaft for cutting and stripping the shield from the cable;

the cable shield stripping means being carried by the forward end of the handle with the cutting blade being aligned with the forward clamping portion of the pressure arm, such that when the forward clamping portion of the pressure arm is pivoted in the first direction towards the forward end of the handle, the shielded cable is clamped by the forward clamping portion of the pressure arm and is pushed into contact with the cutting blade which longitudinally cuts and strips the shield from the cable;

means for providing and controlling the flow of electric power to the motor including an electrical battery disposed in the handle and electrical connection means for electrically connecting the battery to the motor, said connection means being disposed in the handle and an electric switch for controlling the flow of electric power from the battery to the motor, the switch having an "on" position for permitting the flow of electric power and an "off" position for terminating the flow of electric power;

wherein the pivotal movement of the pressure arm in the first direction places the switch in the "on" position, such that the switch is automatically placed in the "on" position for activating the cutting blade at the same time that the shielded cable is clamped between the forward clamping portion and the cutting blade for cutting and stripping of the shield from the cable; and further wherein the pivotal movement of the pressure arm in the second direction places the switch in the "off" position, such that the switch is automatically placed in the "off" position for deactivating the cutting blade at the same time that the shield and the cable are released from between the forward clamping portion and the cutting blade;

the pressure arm further having a second portion located rearwardly of the pivot point for being gripped by the user thereof for pushing the forward end of the pressure arm in the first direction; and whereby the device may be simultaneously held and power deactivated/activated by a user utilizing only one hand;

a blade guard, the blade guard including a forward end having a slot formed therein through which the cutting blade may be received, the blade guard being pivotally joined to the handle at the pivot point, such that the forward end including the slot thereof pivotally moves in a first direction towards the cutting blade so that the cutting blade is received through the slot for contacting the shielded cable, whereby the cutting blade cuts and strips the shield from the cable, and further such that the forward end including the slot thereof pivotally moves in a second direction away from the cutting blade so that the cutting blade is withdrawn from the slot being shielded by the blade guard, whereby accidental cutting by the cutting blade is prevented;

the forward end of the blade guard including a respective clamping portion, and wherein the slot is formed in the clamping portion, such that the shielded cable is firmly clamped between the clamping portions of the pressure arm and the blade guard and against the cutting blade while the cutting blade is cutting and stripping the shield from the cable; and resilient means for constantly urging the blade guard in the second direction and further for constantly urging the forward clamping portion of the pressure arm in the second direction, the resilient means including a pivot shaft carried by the handle between the forward and rearward ends thereof at the pivot point, the pressure arm and the blade guard each being pivotally mounted on the pivot shaft at the pivot point, and a leaf spring carried by the pivot shaft and contacting the pressure arm and the blade guard for constantly urging the pressure arm and the blade guard in the respective second opposite directions.

19. A portable hand-held power-operated electric cable cutter for cutting and stripping a shielded cable, in combination, comprising a handle having an electric motor, a rotary blade disposed in the handle for longitudinally cutting and stripping the shielded cable, the rotary blade being driven by the motor, an electric battery carried by the handle, means for electrically connecting the battery to the motor, an electric on/off switch for selectively activating and deactivating the motor and the rotary blade driven thereby and a pressure ar pivotally joined to the handle. the pressure arm having a forward end pivotally movable in a first direction for contacting and clamping the cable to the rotary blade and in a second direction for unclamping the cable, the pressure arm further having a rearward end for being gripped by the user thereof for pivoting of the pressure arm in the first direction, the pressure arm further including means for automatically placing the switch in the "on" position when the pressure arm is gripped and in the "off" position when the pressure ar is released, whereby the device may be simultaneously held and power deactivated/activated by a user utilizing only one hand.

20. A portable hand-held power-operated electric cable cutter for cutting and stripping a shielded cable, in combination, comprising:

a handle, an electric battery carried by the handle an electric motor carried by the handle, a rotary blade driven by the motor, the rotary blade being disposed in the handle for longitudinally cutting and stripping the shielded cable, a pressure arm pivotally carried by the handle, the pressure arm having a forward end pivotally movable in a first direction for contacting and clamping the cable between the forward end of the pressure arm and the rotary blade and in a second direction for unclamping the cable, the pressure arm further having a rearward end extending from the handle for being gripped by the user thereof for pivoting of the pressure arm in the first direction means for electrically connecting the battery to the motor, such that electric power is supplied by the battery to the motor for driving the rotary blade and a switch for controlling the flow of electric power from the battery to the motor, the switch having an "on" position, wherein the flow of electric power from the battery to the motor is permitted and an "off" position, wherein the flow of electric power from the battery to the motor is prevented, the switch being disposed in the handle, so that gripping of the handle by the user thereof moves the switch into the "on" position, and further so that releasing of the handle by the user thereof moves the switch into the "off" position, whereby the device may be simultaneously held and power deactivated/activated by a user utilizing only one hand.

21. A portable hand-held device for cutting and stripping a shielded cable comprising:

a handle for manual gripping and holding of the device by a user during the use thereof, a power source disposed in the handle, a rotary blade carried by the handle, said rotary blade being rotably driven by the power source, a pressure arm pivotally carried by the handle, the pressure arm having a forward end pivotally movable in a first direction for contacting and clamping the cable between the forward end of the pressure arm and the rotary blade and in a second direction for unclamping the cable, the pressure arm further having a rearward end extending from the handle for being gripped by the user thereof for pivoting of the pressure arm in the first direction, and a switch means formed between the power source and the second end of the pressure arm, the switch means having an "on" and an "off" position, such that when the handle and the pressure arm is gripped during use thereof, the switch means is placed in the "on" position for providing power to the rotary blade for the cutting and stripping of the cable, and further such that when the handle and the pressure arm is released, the switch means is placed in the "off" position for ceasing power to the rotary blade for stopping the movement of the rotary blade, whereby the device may be simultaneously held and power deactivated/activated by a user utilizing only one hand.

22. A portable hand-held device for cutting and stripping a shielded cable, comprising:

a handle for manual gripping and holding of the device by a user during the use thereof, a power source disposed in the handle, a rotary blade carried by the handle, said rotary blade being rotatably driven by the power source for cutting and stripping the shield from the cable, a pressure arm pivotally carried by the handle for pivotal movement between a gripped "on" position and an ungripped "off" position, the pressure arm being further carried by the handle with a portion of the pressure arm as well as the handle being gripped during use thereof, thereby pivoting the pressure arm into the gripped "on" position, and a switch means formed between the pressure arm and the power source, such that when the pressure arm is in the ungripped "off" position, the power source is switched "off", whereby the blade is not driven, and further such that when the pressure arm is in the gripped "on" position, the power source is switched "on", whereby the blade is rotably driven for cutting and stripping the shielded cable, and further whereby the device may be simultaneously held and power deactivated/activated by a user utilizing only one hand.

* * * * *